United States Patent [19]
Gouillou

[11] 3,877,013
[45] Apr. 8, 1975

[54] COLLISION AVOIDANCE SYSTEMS
[75] Inventor: Roger L. Gouillou, Draveil, France
[73] Assignee: Office National d'Etudes et de Recherches Aerospatiales, Chatillon-Sous-Bagneux, France
[22] Filed: Dec. 14, 1972
[21] Appl. No.: 314,972

[30] Foreign Application Priority Data
Dec. 14, 1971 France .............................. 71.44811

[52] U.S. Cl. .......................................... 343/112 CA
[51] Int. Cl. ............................................. G01s 3/02
[58] Field of Search .................. 343/112 A, 112 CA

[56] References Cited
UNITED STATES PATENTS
| | | | |
|---|---|---|---|
| 2,606,317 | 8/1952 | Wallace | 343/112 CA |
| 3,167,772 | 1/1965 | Bagnall et al. | 343/112 CA |
| 3,293,600 | 12/1966 | Gifft | 343/112 CA |
| 3,551,884 | 12/1970 | Shear et al. | 343/112 CA |

Primary Examiner—Maynard R. Wilbur
Assistant Examiner—T. M. Blum
Attorney, Agent, or Firm—Abraham A. Saffitz

[57] ABSTRACT

Improvements to the collision avoidance systems of the Tau type. The improvement consists in transmitting in one station first pulse groups each formed by a warning pulse, a range pulse and an altitude pulse and second pulse groups each formed by a warning pulse and synchronizing pulse trains the pulses in the groups succeeding one another in such a way that the beginning of a pulse follows the end of the preceding pulse by a constant time interval. At another station the pulses are demodulated without integration on the one hand and integrated with a time constant larger than the constant time interval and attenuated on the other hand. The demodulated signal and the integrated and attenuated signal are compared and the times when their amplitudes are equal are measured. These times are used to determine range and altitude and to synchronize the time keeping clocks of the receiver station.

3 Claims, 7 Drawing Figures

COLLISION AVOIDANCE SYSTEMS

The present invention concerns improvements to airborne collision avoidance systems (CAS) and, particularly to such systems using the Tau concept in which the time until collision is determined by dividing range by range rate.

The principle of operation of a CAS is based upon precise time synchronization and time-controlled frequency switching in all the stations which will allow for the interchange of data between a large number of stations, all the stations cycling simultaneously with an accuracy of a fraction of a microsecond.

The CAS utilizes a three-second cycle, referred to as an epoch, which is divided into 2,000 periods lasting 1,500 microseconds termed message slots. Successive message slots are separated by cyclically switching the operating frequency among four discrete frequencies. Each operating CAS station uses one slot to transmit a CAS message. During this time slot, all other stations within transmission range will receive the message and evaluate the data for a collision threat.

The start of each epoch is identified by a distinctive combination of three pulses, known as an epoch start triad. Alternate epochs are designated as ground or air epochs, and are so identified by the pulse spacing of their respective epoch start triads. Ground epoch start triads are transmitted by ground stations, while air epoch start triads are transmitted by synchronous mode airborne stations. This logic initiates the synchronous process which permits accurate one-way range determination.

The CAS message includes a 200 $\mu$s range pulse transmitted 15 $\mu$s after the start of the message slot, a 4 $\mu$s altitude pulse time coded within the slot and a synchonization reply. As it is known, data extracted from the message and used for the threat evaluation are range, range rate and barometric altitude referenced to the transmitting aircraft. The range to the transmitting aircraft is determined by measuring the difference between the time of receipt and the known time of transmission, of the leading edge of the range pulse. Range rate is determined by measuring the doppler shift of the carrier frequency on the range pulse as compared with the receiver reference frequency. The altitude of the transmitting aircraft is determined by measuring the receipt time of the altitude pulse relative to the receipt time of the leading edge of the range pulse. During transmission, this pulse is time position coded as a function of the electrical signal from a digital output barometric altimeter. On aircraft receiving the CAS message, the altitude received is compared with its own digital altimeter output to determine relative altitude difference.

It results from the operation of the Tau system which has just been described that the accuracy of the data: time, range, altitude depends on the measure of the time of occurrence of leading edges of pulses. As regards the range rate its accuracy depends on the duration of the range pulse.

The principal object of the invention is to increase the accuracy of those of the data transmitted by the Tau system which depends on pulse occurrence time measures.

Another object of the invention is to increase the accuracy of those of the data transmitted by the Tau system which depends on the duration of radiofrequency pulses.

Generally speaking, means are provided in the CAS transmitters to transmit epoch start triads on the one hand and CAS messages on the other hand in the form of radiofrequency wave pulse groups including a warning pulse preceding significant pulses, the latter conveying information represented by the duration between the instants of occurrence of the pulses of the group, the pulses of the group being separated by intervals of constant duration wherein the radiofrequency wave is cut-off. In the CAS receivers, the receiver is provided with an automatic gain control circuit having an integrating constant smaller than the duration of the warning pulse and the instants of occurrence of the leading edges of the significant pulses are measured by comparing the demodulated epoch start triads and the demodulated CAS messages respectively with a given fraction, say a half, of the demodulated and integrated epoch start triads and the demodulated and integrated CAS messages.

It results from this improvement that the measure of the time of occurrence of the leading edge of a pulse which is difficult to measure due to unavoidable shunt capacitance in the receiver is replaced by the measure of the time at which the amplitude of a signal reaches a given fraction, say half, of its peak value.

With no change in the duration of the time slot assigned to a CAS station, say 1,500 $\mu$s, the range pulse can take a duration four times larger than in the prior art, say 800 $\mu$s instead of 200 $\mu$s. As it is known that the accuracy of the measure of a Doppler effect during a short time interval varies according to the power 3/2 of this interval, a gain of 4 in duration results in a gain of 8 in Doppler frequency accuracy.

The improvement of the invention also provides a protection against echoes. Since the transmission of a pulse group is only interrupted during the cut-off intervals which have a duration of approximately 4 to 5 $\mu$s, echoes which (i) have an amplitude smaller than the half of the peak amplitude (the fraction under consideration is assumed to be one-half or (ii) have a delay smaller than the time interval which at half peak amplitude corresponds to $\theta$ at full peak amplitude will not disturb the operation of the Tau system.

For a fuller understanding of the nature and objects of the invention, reference should be had to the following detailed description taken in connection with the accompanying drawings in which.

Figure 1:
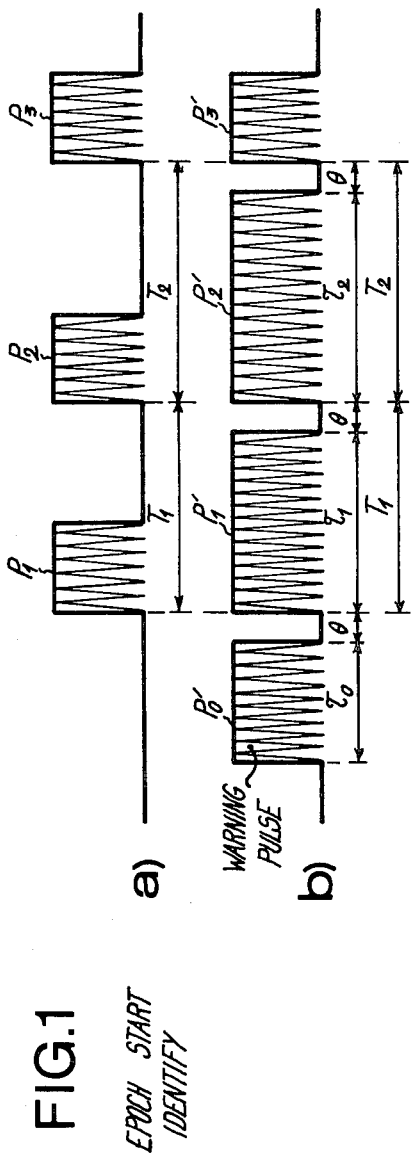
FIGS. 1a and 1b are diagrams illustrating the waveform of the synchronization signal transmitted by the ground station in the prior art and in the invention.

FIG. 1a represents a conventional epoch start triad. It comprises three pulses $P_1$, $P_2$, $P_3$, respectively separated by intervals $T_1$ and $T_2$ measured between the leading edges of two consecutive pulses of the triad. In practice, pulses $P_1$, $P_2$, $P_3$ are 1.6 $\mu$s wide; in the case of a ground epoch start triad $T_1 = 9.6$ μs, $T_2 = 16$ μs and in the case of an air epoch start triad $T_1 = 8$ μs, $T_2 = 17.6$ μs.

FIG. 1b represents an epoch start triad signal according to the invention. It comprises a warning pulse $P_0'$ and three pulses $P_1'$, $P_2'$, $P_3'$ forming the triad, these pulses being respectively separated by intervals by $T_0$, $T_1$, $T_2$ measured between the leading edges of two consecutive pulses. Intervals $T_0$, $T_1$, $T_2$ each comprise the duration of the pulses proper respectively $\tau_0$, $\tau_1$, $\tau_2$ increased by a constant time complement $\theta$. During the times $\theta$, the carrier is cut-off.

Figure 2:
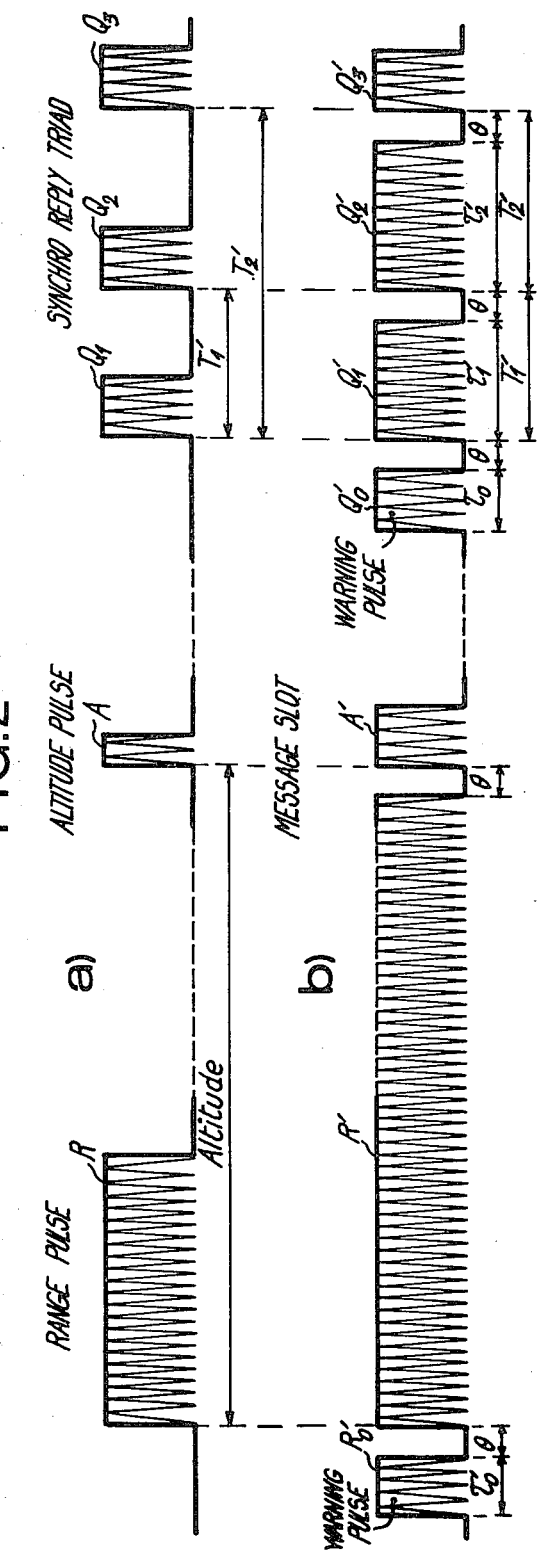
FIGS. 2a and 2b are diagrams illustrating the waveform of the synchronization signal transmitted by an aircraft to all other aircrafts in the system.

FIG. 2a represents a CAS message. It comprises, in a time slot assigned to a station, a range pulse R of 200 μs duration, a position modulated altitude pulse A of 4 μs duration and a "ground-air" or "air-air" synchro reply triad $Q_1$, $Q_2$, $Q_3$. In this triad, the values of $T_1'$, $T_2'$ are 6.4 and 14.4 μs in the case of a ground-air reply and 11.2 and 19.2 μs in the case of an air-air reply.

FIG. 2b represents a CAS message signal according to the invention. It comprises a warning pulse $R_0'$, a range pulse $R'$ beginning at the same time as the range pulse R and separated from the warning pulse $R_0'$ by an interval $\theta$ without carrier, an altitude pulse $A'$ which may be wider than altitude pulse A and separated from range pulse $R'$ by an interval $\theta$ without carrier, a warning pulse $Q_0'$ and three pulses $Q_1'$, $Q_2'$, $Q_3'$ forming the triad, these pulses being separated by intervals $\theta$ without carrier. The pulses $Q_0'$, $Q_1'$, $Q_2'$, $Q_3'$ are derived from pulses $Q_1$, $Q_2$, $Q_3$ in the same way as pulses $P_0'$, $P_1'$, $P_3'$ from pulses $P_1$, $P_2$, $P_3$.

Figure 3:
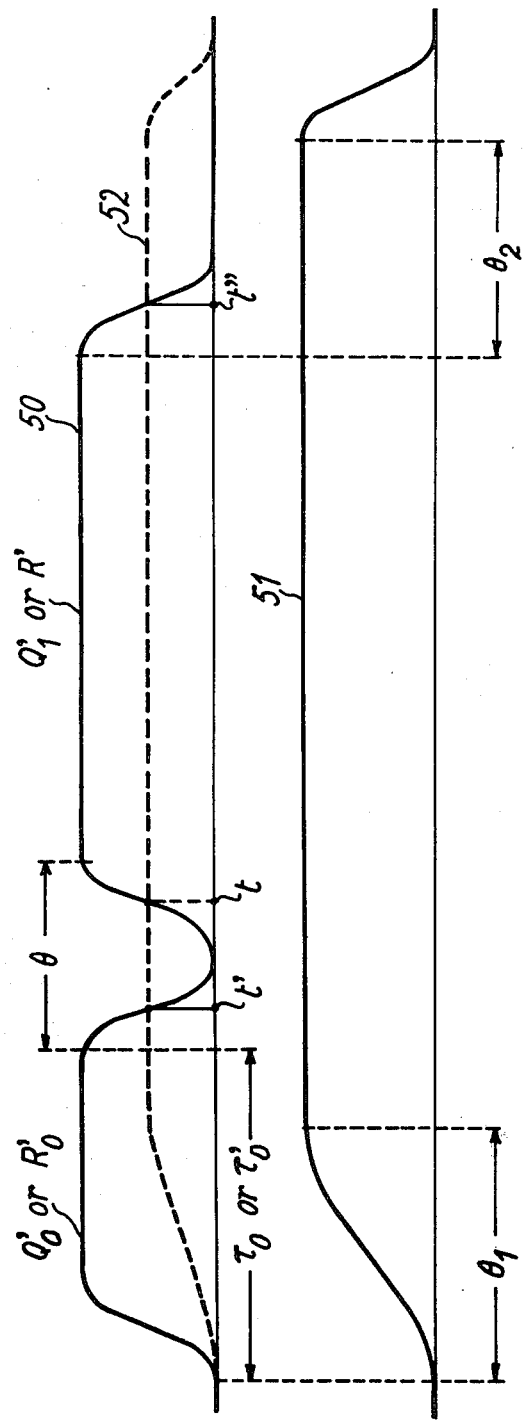
FIG. 3 is a diagram of the demodulated signal and the demodulated and integrated signal in the aircraft receiver for explaining the operation of the receiver.

In FIG. 3 curve 50 represents the two first pulses of an epoch start triad, that is the warning pulse and the first pulse of the triad, or the two first pulses of a CAS message, that is the warning pulse and the range pulse. As explained in the introductory part, the duration $\tau_0$ of warning pulse $Q_0'$ and the duration $\tau_0'$ of warning pulse $R_0'$ are different and for instance $\tau_0'$ is larger than $\tau_0°$.

Curve 51 represents the integrated signal derived from curve 50 by an integrator circuit having two different RC constants according to whether the demodulated signal is increasing or decreasing. Curve 52 represents a signal derived from signal 51 by an attenuator circuit having a given attenuation factor, say two.

Figure 4:
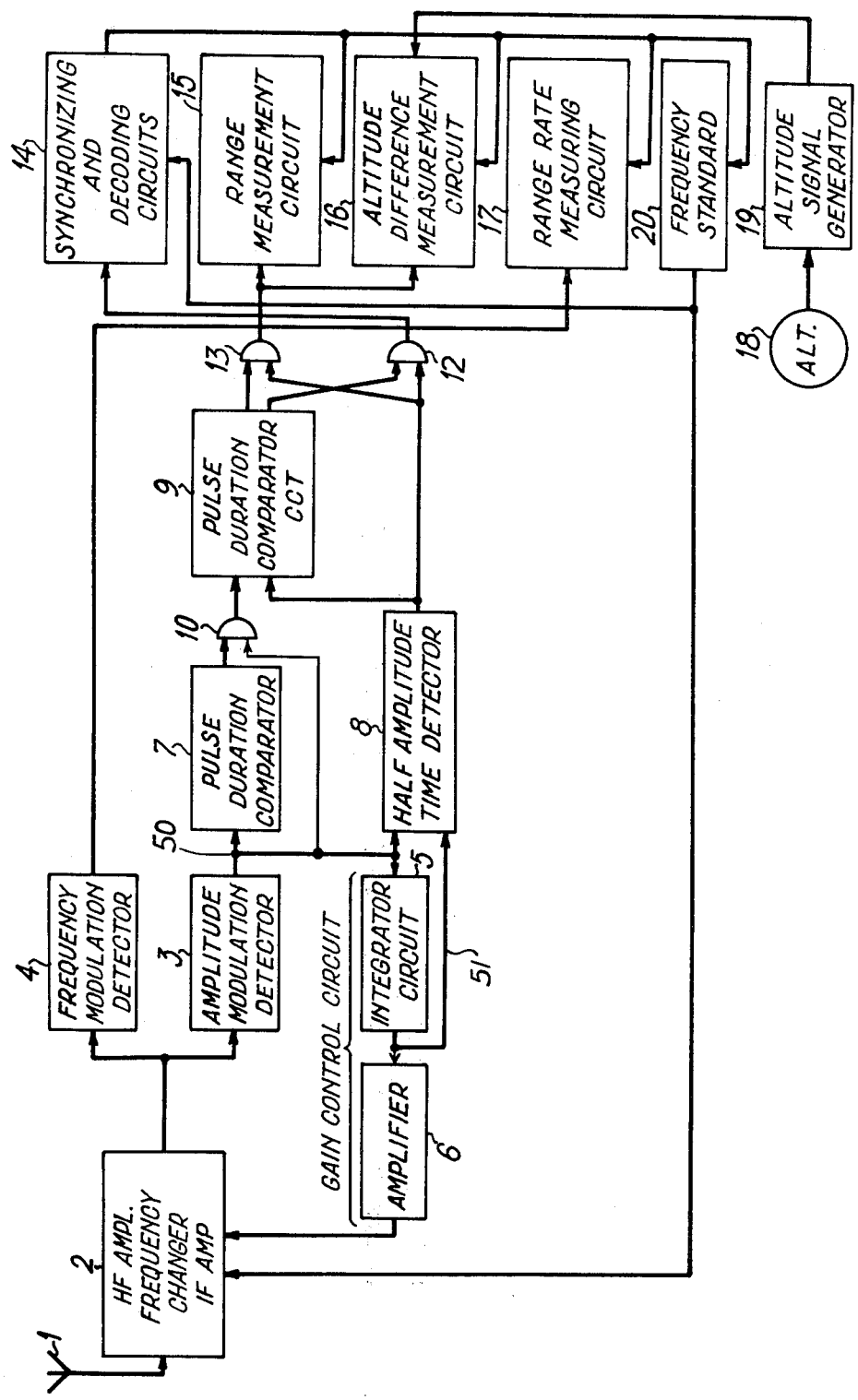
FIG. 4 is a detailed block and line diagram of the receiver equipment in the system of my invention.

Referring now to FIG. 4, there is represented an airborne CAS receiver station which receives from a ground CAS station epoch start triads and from other airborne CAS stations, range, range rate and altitude messages. The receiver comprises an antenna 1, an HF amplifier, frequency changer and intermediate amplifier stage 2, an amplitude modulation detector stage 3, a frequency modulation detector stage 4 and a gain control circuit including an integrator circuit 5 and a voltage amplifier 6.

Integrator circuit 5 has a R-C constant $\theta_1$ in the direction of increasing signals which is smaller than the smaller of the two durations $\tau_0$ and $\tau_0'$ and a R-C constant $\theta_2$ in the direction of decreasing signals which is larger than the duration $\theta$ of the cut-off intervals. Integrator circuits having two different R-C constants according to the direction of signal variation are well known in the art and conventionally include an input separator circuit, two differently poled diodes, R-C circuits in cascade with said rectifier and an output separator circuit.

The output of amplitude modulation detector 3 is connected to pulse duration comparator circuit 7 and to the first input of half amplitude time detector 8. The second input of detector 8 is connected to the output of integrator circuit 5. By its first input, detector 8 receives signal 50 of FIG. 3 and by its second input it receives signal 51. Detector 8 compares signal 50 to the half of signal 51 that is to signal 52 of FIG. 3 and produces an output pulse when they are of equal amplitude. According to the usual case in comparators, the output pulses are of one polarity or the other according to whether one of the signals reaches equality with the other by increasing or decreasing values. Detector 8 is so polarized as to give output pulses coinciding with instants $t$ and not output pulses coinciding with instants $t'$, $t''$ (FIG. 3).

The output of pulse duration comparator circuit 7 is connected to the first input of another pulse duration comparator circuit 9. The second input of circuit 9 is connected to the output of half-amplitude time detector 8. Circuits 7 and 9 are of the same kind only differing the comparison term. The former compares the duration of its input pulse to a predetermined duration and according to whether the input pulse duration is larger or smaller than the predetermined duration, it opens or closes an AND gate 10 inserted between comparators 7 and 9. The purpose of circuit 7 is to prevent applying to the logic stray pulses which would have a duration shorter than the predetermined duration, said predetermined duration being selected shorter than the shorter of durations $\tau_0$ and $\tau_0$. The latter circuit 9 compares the time interval between the leading edge of the pulse from AND-gate 10 and the instant $t$ of occurrence of the output pulse of time detector 8. Thus the time interval measured is $\tau_0 + \theta$ in the case of reception of an epoch start triad and $\tau_0' + \theta$ in the case of reception of a CAS message. According to whether this time interval is larger of smaller than $\theta + (\tau_0 + \tau_0')/2$, pulse duration comparator circuit 9 respectively opens AND-gate 12 or AND-gate 13.

The signal from the frequency modulation detector 4 is fed directly to the range rate measuring circuit 17 while the signal from AND-gate 12 is connected as shown to the synchronizing and decoding circuits 14 and the signal from AND-gate 13 to the range measuring circuit 15 and the altitude difference measuring circuit 16.

The aircraft altimeter 18 supplies a signal to the altitude signal generator 19 which, in turn, controls the altitude difference measurement circuit 16.

Synchronizing and decoding circuits 14 controls the range measurement circuit 15, the altitude difference measurement circuit 16, range rate measuring circuit 17 and a frequency standard 20. Frequency standard 20, in turn, controls the amplifier and frequency changer 2, the transmitter 26 of FIG. 5 and the synchronizing and decoding circuits 14.

It is deemed that circuits 14 to 20 inclusive do not need a detailed description in the present specification since they are known in the art. In that respect, reference may be made to U.S. Pat. No. 3,167,772 issued on Jan. 26, 1965 to J. J. Bagnall Jr. et al.

Figure 5:
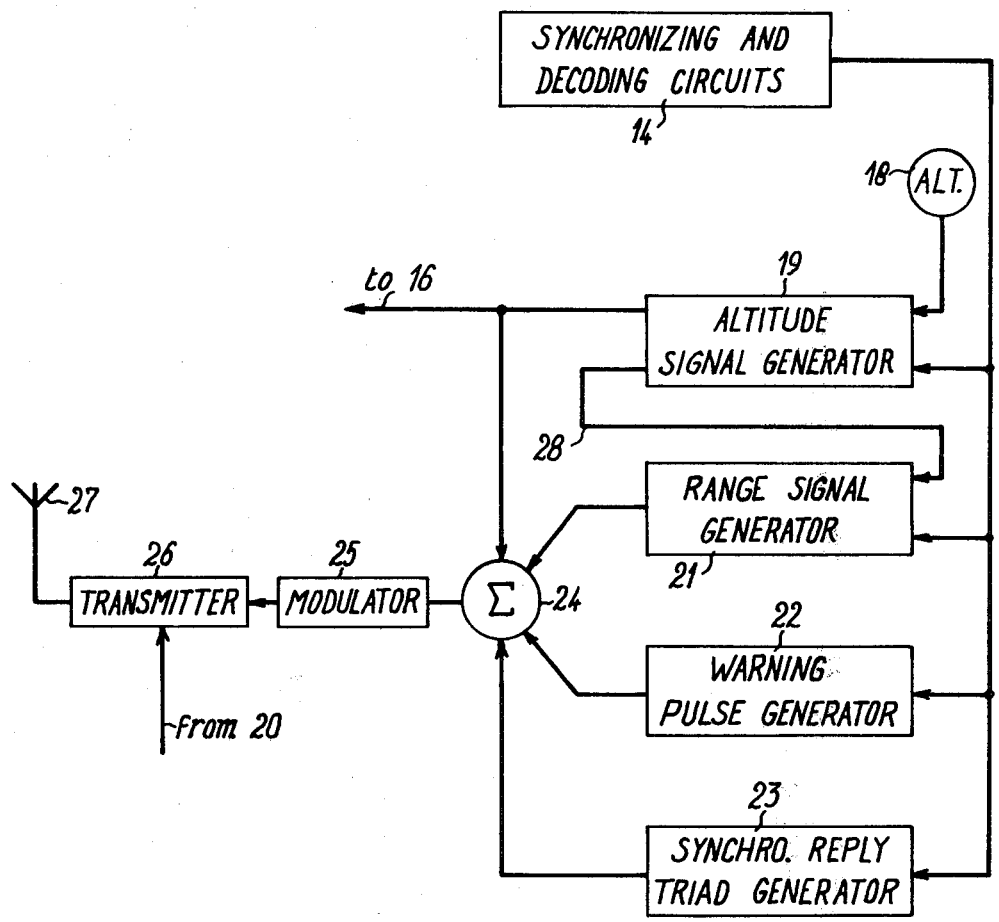
FIG. 5 is a detailed block and line diagram of the transmitter equipment in the system of my invention.

FIG. 5 represents the transmitter equipment of an airborne CAS station.

The transmitter equipment comprises an antenna 27, a transmitter 26 controlled in frequency by the aircraft frequency standard 20 and a modulator 25 of conventional design which supplies the transmitter with signals appropriate to amplitude modulate the transitter output signal at the proper times with the proper information.

The modulation 25 is supplied the signals for transmission from the summing junction 24 to which are supplied signals from the altitude signal generator 19, the range signal generator 21, the warning pulse generator 22 and the synchro reply triad generator 23. All the pulses begin and end at predetermined times in the slot except the beginning of the altitude pulse A' which is time-modulated and consequently the end of the range pulse R'. So, signal generators 19, 21, 22, 23 are controlled by the synchronizing and decoding circuits 14 except the altitude signal generator 18 which is further controlled by the aircraft altimeter 18 and the range signal generator which is further controlled, through lead 28, by an output signal of altitude signal generator 19 leading the altitude pulse by a time interval $\theta$.

What I claim is:

1. In a system for indicating the threat of collision between at least two relatively mobile stations having keeping time means and comprising means at a first of said stations for transmitting to at least the second of said stations a radiofrequency timing pulse train for keeping time at at least said two stations, a radiofrequency range pulse whose leading edge occurs at a predetermined time and a radiofrequency altitude pulse whose leading edge follows the leading edge of said range pulse by a time interval proportional to the altitude of said first station, means at a second of said stations for receiving said timing, range and altitude pulses, means at said second station for determining the travel time of the received range pulse and the time interval between the leading edges of the received range and altitude pulses and means deriving from said travel time and said time interval and altitude difference data for evaluating the threat of collision between said stations from said travel time and time interval, the improvement consisting at the first of said station in means for sequentially transmitting a warning pulse, the range pulse and the altitude pulse, the end of one of said pulses being separated from the beginning of the successive pulse by a constant time interval, and at the second of said stations in means for receiving a signal formed by said warning, range and altitude pulses, means for integrating said received signal with an integrating time constant larger than said constant time interval and obtaining an integrated signal, means for demodulating said received signal, means for comparing the levels of the demodulated received signal and of a given fraction of said integrated signal and deriving therefrom the instants of occurrence at which said levels are equal and means for deriving from said occurence instants said range, range rate and altitude difference data.

2. The improvement as set forth in claim 1 consisting at the first of said stations in means for sequentially transmitting a first pulse group including a first warning pulse, the range pulse and the altitude pulse, and a second pulse group including a second warning pulse and said radio frequency timing pulse train, the end of one of said pulses of the first and second pulse groups being separated from the beginning of the successive pulse by a constant time interval and at the second of said station in means for receiving a first signal formed by said first pulse group and a second signal formed by said second pulse group, means for integrating said received first and second signals with an integrating time constant larger than said constant time interval and obtaining a first and a second integrated signals, means for demodulating said received first and second signals, means for comparing the levels of the demodulated first received signal and of a given fraction of the first integrated signal and for comparing the levels of the demodulated second received signal and of a same fraction of the second integrated signal and deriving therefrom first instants of occurrence at which levels of said first signals are equal and second instants of occurrence at which levels of said second signals are equal, means for deriving from said first occurrence instants said range, range rate and altitude difference data and means for controlling the keeping time means of said second station by said second occurrence instants.

3. The improvement as set forth in claim 1 in which said given fraction is equal to one-half.

* * * * *